United States Patent Office 2,950,925
Patented Aug. 30, 1960

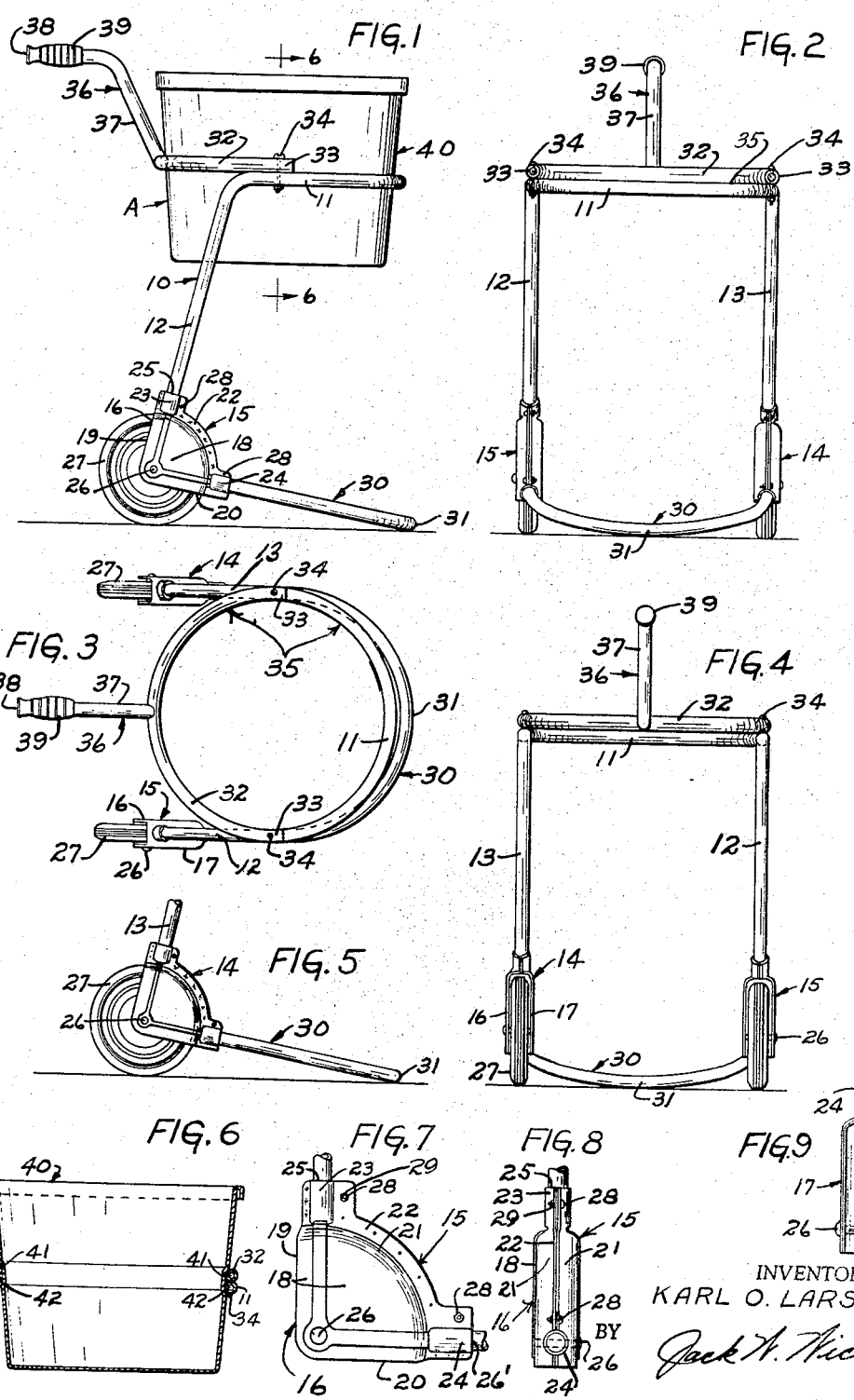
Aug. 30, 1960     K. O. LARSON     2,950,925
UTILITY PUSH CART
Filed Aug. 26, 1957
INVENTOR.
KARL O. LARSON
ATTORNEY

2,950,925

UTILITY PUSH CART

Karl O. Larson, 288 Stonebridge Blvd., St. Paul, Minn.

Filed Aug. 26, 1957, Ser. No. 680,101

5 Claims. (Cl. 280—47.19)

My invention relates to an improvement in carts and more particularly to a hand operated utility push cart having a frame and a body secured thereon for transporting various types of material.

It is an object of my invention to provide a cart having a frame construction to which a hollow body member is removably connected in a new and novel manner, the body being mounted on the frame without the need of brackets, clamps, screws, or any type of manipulative means for securing the same to the cart.

It is a further object to provide a push cart having a new and novel fender-bracket construction for the wheels of the cart.

It is also an object of my invention to provide a cart which supports a hollow body substantially parallel with the surface on which it is used and which may be easily moved from place to place including easy movement of the cart up and down stairs.

It is still another object of my invention to provide a cart which assumes an upright position without any adjustment whatever and which is easily moved with one hand of the operator.

I shall not here attempt to set forth and indicate all of the various objects and advantages incident to my invention, but other objects and advantages will be referred to or else will become apparent from that which follows.

The invention will appear more clearly from the following detailed description when taken in connection with the accompanying drawings, showing by way of example a preferred embodiment of the inventive idea wherein like numerals indicate like parts throughout.

In the drawings forming part of this application:

Figure 1 is a side elevational view of my cart.

Figure 2 is a front view of the cart with the body member removed.

Figure 3 is a top plan view of the cart with the body removed.

Figure 4 is a rear view thereof with the body member removed.

Figure 5 is a detailed view of the inside of the fender bracket construction.

Figure 6 is a sectional view on the line 6—6 of Figure 1 showing in detail how the hollow body member is removably mounted and supported on the cart frame.

Figure 7 is an enlarged side view of the fender-bracket member.

Figure 8 is an end view of the member illustrated in Figure 7.

Figure 9 is an end view opposite to that shown in Figure 8.

Referring to the drawings in detail, my utility push cart A includes the tubular frame member 10 composed of the horizontal substantially semicircular frame component 11 which has depending therefrom the leg portions 12 and 13 which are normally at a slight angle to the vertical. The lower ends of the leg portions 12 and 13 are secured in the fender-bracket members 14 and 15 which are identical in construction and as a result only the bracket 15 will be described in detail. The fender-bracket 15 is composed of two identical half portions 16 and 17, and as a result only one die need be made to form the complete fender-bracket combination 15. Inasmuch as the half portions 16 and 17 are identical, only the half portion 16 will be described in detail. The half portion 16 includes the side wall portion 18 defined by the substantially straight side edge 19 and the lower edge 20 at a right angle thereto together with the semi-circular cupped edge 21 extending from the side wall portion 18. The cupped semicircular edge 21 terminates in a substantially semicircular flat plate portion 22 coextensive therewith, and the plate portion 22 has formed therein the upper semicircular half socket portion 23 and the lower half socket portion 24. When the two half portions 16 and 17 are combined, as particularly illustrated in Figures 7, 8, and 9 the half socket portions 23 align with the half socket portions 24 to form the fender-bracket 15 with the upper socket 25 and the lower socket 26'. Also, with the plate portions 22 together the cupped portions 21 form a transverse wall between the side wall portions 18.

Secured to the wall portions 18 of the half portions 16 and 17 is the axle 26 on which the wheels 27 are mounted. The axle 26 also aids in securing the fender-bracket half portions 16 and 17 together. Further provided are the short bolt members 28 extending through the flat plate portions 22 adjacent the socket portions 23 and 24 and secured by the nuts 29. With the bolts 28 secured in place the half portions 16 and 17 are securely held together, and the bolts 28 bring the socket portions 23 and 24 tightly together upon the lower ends of the leg portions 12 and 13 of the frame member 10, and the outer free ends of the U-shaped lower support 30. The support member 30 extends outwardly at an angle from the fender-brackets 14 and 15 to the arcuate front portion 31 which contacts the floor to thereby support the semicircular frame portion 11 in substantially a horizontal position as illustrated particularly in Figure 1.

I further provide the substantially semicircular frame component 32 which is secured at the outer free ends 33 thereof to the semicircular frame component 11 by means of the bolts 34, and when so secured the two component frame members together form a completed substantially circular frame 35. Secured centrally to and extending upwardly from the frame member 32 at an angle is the handle member 36 formed of the straight portion 37 and the angularly disposed portion 38 on which the handle grip 39 is mounted.

The numeral 40 indicates the substantially cylindrical hollow body member in the form of a substantially truncated cone closed at the bottom end and made of a yieldable material such as plastic. The body 40 is tapered inwardly from top to bottom, and the diameter of the hollow body 40 approximately centrally thereof is substantially that of the inside of the substantially circular frame composed of the two substantially semicircular frame members 11 and 32. The hollow body member 40 is removably secured to the frame 35 of the cart A by placing the same within the frame 35 and wedging it slightly downwardly against the frame 35 so that the body 40 is slightly deformed annularly as at 41.

The deformation at 41 into which the frame 35 is positioned provides a shoulder 42 prohibiting the body member 40 from moving up without pressure being applied. As the body 40 is pushed downwardly the same tends to wedge more tightly into the frame 35, but the body 40 cannot be wedged too tightly into the substantially circular frame 35 and deformed even under extreme conditions, for due to its substantially circular construction the body 40 is under substantially equal compression at its entire peripheral contact with the circular frame 35. Applicant has found, for example, that the body 40 will support the weight of a man standing on the bottom thereof and as a result the hollow body is still easily removed from the frame 35 and is not deformed.

In using the cart A the same is tilted backwardly slightly from the position shown in Figures 1-4 by means of the handle 36 just far enough so that the outer arcuate end portion 31 of the support member 30 is raised slightly off the supporting surface at which position the cart may be easily pushed about. Due to my construction the hollow body 40 may be easily removed from the frame 35 by pulling upwardly on the same whereby the same may be carried about with the contents if desired.

The invention is not to be understood as restricted to the details set forth, since these may be modified within the scope of the appended claims without departing from the spirit and scope of the invention.

Having thus described the invention, that which I claim as new and desire to secure by Letters Patent is:

1. In a push cart, the combination of a substantially semicircular frame component, a second substantially semicircular frame component secured to said first semicircular frame component to form a substantially circular frame member, said second semicircular frame component having leg portions depending therefrom, a U-shaped lower support member having the outer free ends thereof connected to the lower ends of said depending leg portions, a pair of wheels, means for mounting said wheels at the point of connection of said leg portions and the free ends of said U-shaped support member, and a handle member connected to said first mentioned semicircular frame component.

2. In a push cart, the combination of a substantially circular frame, leg members connected to and depending from said circular frame, a fender and wheel support member for each leg member, each including a pair of identical half portions each having a side wall portion and a cupped portion defining a portion of the edge of said fender and wheel support, a flange extending from said semicircular cupped portion, an upper and lower half socket portion formed in said flange, means for securing said half portions together whereby said side walls and cupped portions form a fender and said half socket portions form upper and lower sockets, a short axle member secured to said side wall portions of said fender and wheel support, a wheel mounted on said axle, a portion of which extends into said fender member, a lower support member having the ends thereof secured in said lower sockets of said fender, and handle means connected to said circular frame, the lower ends of said leg members being secured in said upper sockets of said fender and wheel supports.

3. In a push cart, a substantially circular frame, leg members connected to and depending from diametrically opposed points on said circular frame, a fender and wheel support member for each leg member each including a pair of identical half portions each having a side wall portion and a semicircular cupped portion defining a portion of the edge of said fender and wheel, an upper and lower half socket portion formed on said cupped portions, means for securing said half portions together whereby said side walls and cupped portions form a fender and said half socket portions form upper and lower sockets, a wheel mounted on said half portions and extending therebetween, a lower support member having the ends thereof secured in said lower sockets and the lower ends of said leg members secured in said upper sockets.

4. A cart for carrying groceries and the like comprising a horizontal circular frame adapted to receive a basket therein, said frame including a rear semicircular member and a forward semicircular member, a portion of each of the outer free ends of said rear semicircular member being in overlying horizontal relationship to a portion of each of the outer free ends of said forward semicircular member, handle means attached to said rear semicircular member, spaced leg members integral with said forward semicircular member and depending therefrom adjacent the forward edge of said rear semicircular member, fender and wheel support means attached to said leg members and a resting bar attached to said fender and wheel support means.

5. In a push cart, a circular frame member, leg members connected to and depending from the medial portion of said circular frame member, wheel supports and fender means having vertical non-coplanar side walls connected to said leg members, wheels connected to said wheel supports and fender means, and support means connected to and extending from said wheel supports and fender means.

References Cited in the file of this patent

UNITED STATES PATENTS

| D. 157,597 | Huber | Mar. 7, 1950 |
| D. 179,126 | Eging | Nov. 6, 1956 |
| 319,524 | Steel | June 9, 1885 |
| 1,462,152 | Smith | July 17, 1923 |
| 2,466,148 | Birr | Apr. 5, 1949 |
| 2,819,091 | Lampe | Jan. 7, 1958 |

FOREIGN PATENTS

| 732,276 | Great Britain | June 22, 1955 |